United States Patent [19]

Thorngate

[11] 3,734,444

[45] May 22, 1973

[54] SAFETY LOCKING DEVICE FOR AIRBORNE SHOCKMOUNTS

[75] Inventor: Robert E. Thorngate, Kettering, Ohio

[73] Assignee: The United States of America as represented by the Secretary of the Air Force, Washington, D.C.

[22] Filed: June 8, 1971

[21] Appl. No.: 151,048

[52] U.S. Cl. .................. 248/361 R, 151/2 R, 151/28
[51] Int. Cl. .............................................. B65d 45/24
[58] Field of Search........................ 151/27, 28, 29, 2; 248/316, 25, 361; 220/55

[56] References Cited

UNITED STATES PATENTS

| | | | |
|---|---|---|---|
| 1,199,684 | 9/1916 | Forbes | 151/2 R |
| 2,798,635 | 7/1957 | Elkind | 220/55 |
| 2,917,266 | 12/1959 | Sanbonn et al. | 248/361 |
| 3,212,746 | 10/1965 | Wright | 248/361 |

Primary Examiner—Edward C. Allen
Attorney—Harry A. Herbert, Jr. and Richard J. Killoren

[57] ABSTRACT

A safety locking device for securing electronic apparatus to airborne shockmounts having a cone washer for engaging a hook on the electronic apparatus. The cone washer is slidably supported on a hold down screw having flat sides which conform to flat sides of the cone washer to prevent rotation of the cone washer on the screw. A two part nut has a plurality of slots for engaging a plurality of pins on the cone washer, and a spring for maintaining the pins engaged in the slots. One part of the two part nut engages the threads on the hold down screw, and a second part is for turning the first part on the screw. Pins on the first part of the two part nut engage slots on the second part with a loose fit, to permit limited relative rotation between the two parts of the two part nut.

2 Claims, 6 Drawing Figures

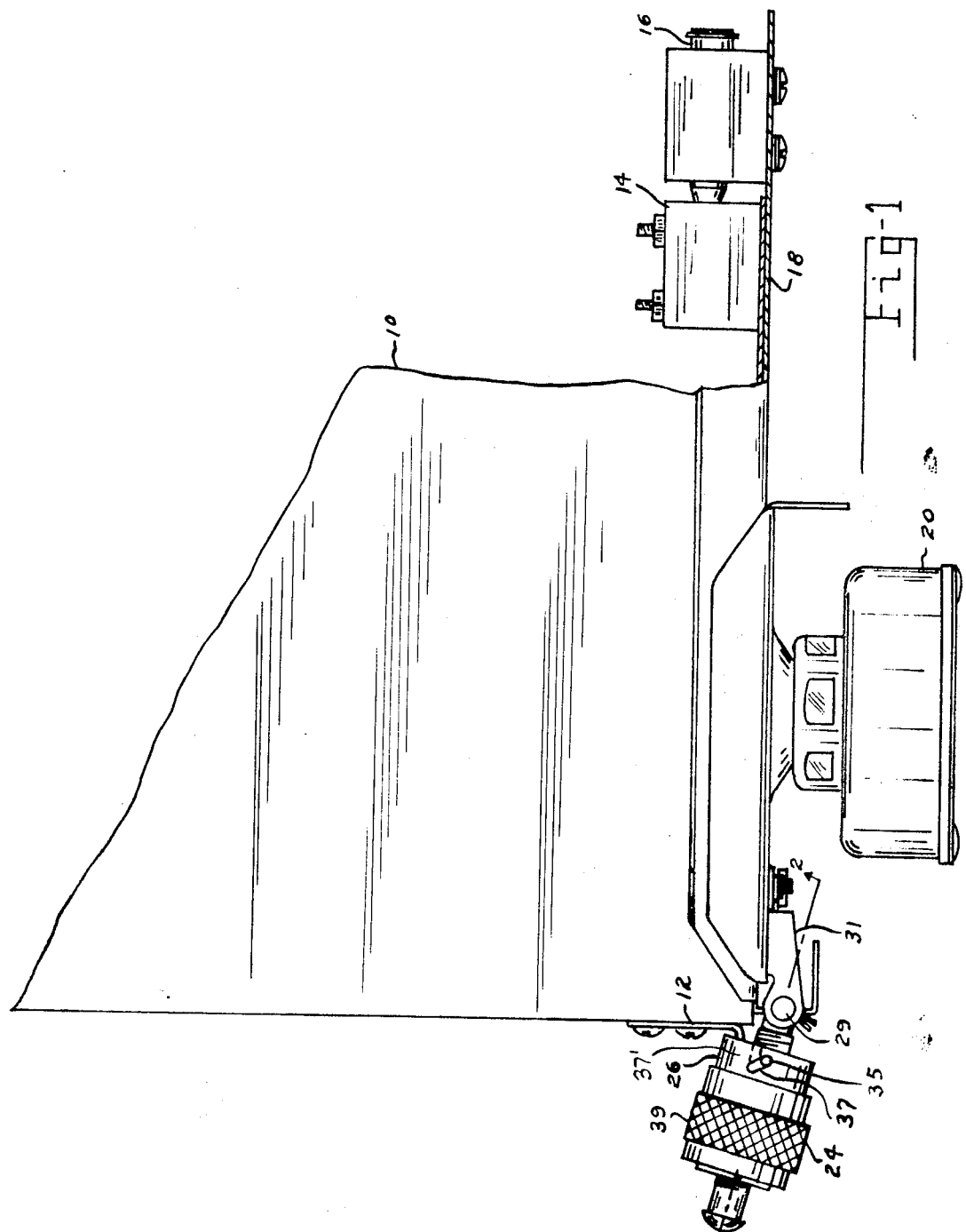

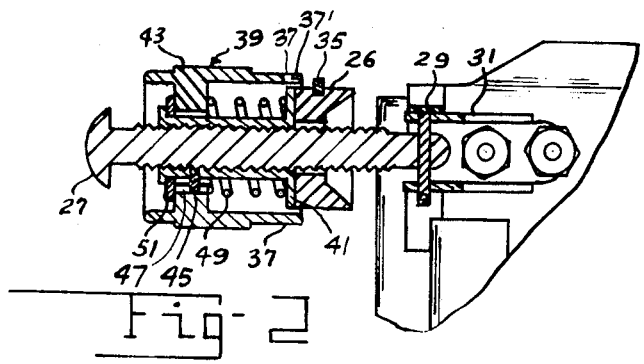
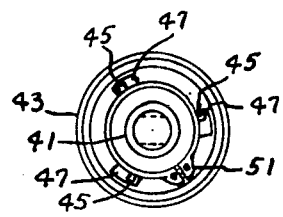
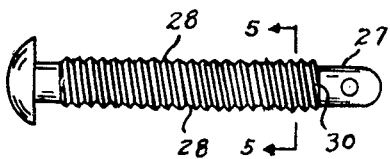
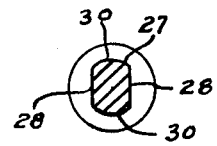
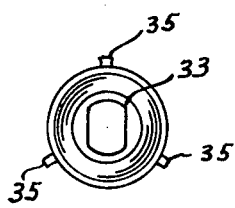

SAFETY LOCKING DEVICE FOR AIRBORNE SHOCKMOUNTS

BACKGROUND OF THE INVENTION

In fastening airborne electronic equipment in their associated shockmounts, it has been the practice to place a cone washer over the equipment hook, which is then tightened by a wing nut. A safety wire is then used to secure the wing nut to the shockmount frame to keep the nut from loosening due to vibration. This required that the wire be carried so that the wing nuts could again be safety wired after equipment repair. Also, if care was not exercised the wire, when removed, would fall down into equipment on board the aircraft and sometimes cause extensive damage.

BRIEF SUMMARY OF THE INVENTION

According to this invention, a safety locking device is provided which makes the use of safety wires unnecessary. The device of the invention has a cone washer that slides on a hold down screw which has two flat sides. The cone washer has a hole with two flat sides so that it cannot turn on the hold down screw. A spring loaded two part nut turns on the hold down screw, and is secured to three pins on the cone washer. Pins on one part of the two part nut move in slots on the other part of the two part nut to permit locking of the two part nut onto the pins on the cone washer.

IN THE DRAWINGS

FIG. 1 is a partially cut away side elevation of electronic equipment secured to a shockmount with the safety locking device of the invention.

FIG. 2 is a sectional view of the safety locking device along the line 2—2 of FIG. 1 but with the washer separated from the nut.

FIG. 3 is an end view of the safety locking device of FIG. 1.

FIG. 4 is a side view of the hold down screw for the safety locking device of FIG. 1.

FIG. 5 is a sectional view along the line 5—5 of FIG. 4.

FIG. 6 is an end view of the cone washer for the safety locking device of FIG. 1.

DETAILED DESCRIPTION OF THE INVENTION

Reference is now made to FIG. 1 of the drawing, which shows an electronic equipment housing 10 having a conventional mounting hook 12 and locking block 14 secured thereto which is secured to a standard spring loaded pin 16 on support member 18, which is secured to a standard shockmount 20.

The housing 10 is held on the shockmount by means of spring loaded pin 16 and a safety locking device 24, shown in greater detail in FIGS. 2-6.

The safety locking device 24 has a cone washer 26, which engages mounting hook 12 on the housing 10, as shown in FIG. 1. A hold down screw 27 is secured by means of a pin 29 to a bracket 31 on shock mount support member 18. The hold down screw 27 has two flat sides 28 and two threaded surfaces 30, as shown in FIG. 5. As shown in FIG. 6, the cone washer 26 also has two flat sides so that the cone washer can slide on the hold down screw 27 but not turn on the screw. The cone washer 26 has three projecting pins 35 for engaging slots 37 on a two part nut 39. The two part nut 39 has a first part 41, which threadably engages hold down screw 27, and a second part 43, which is keyed to the first part, as shown in FIG. 3. Pins 45 engage slots 47 with a loose fit so that part 43 can be rotated a small amount to engage pins 35 in slots 37 without turning part 41. A spring 49, positioned between parts 41 and 43, acts to retain the pins 35 in the slots 37. Part 41 is retained in part 43 by means of a conventional snap ring 51.

In the operation of the device, the housing 10 is retained on the shock mount by engaging spring loaded pin 16 in the block 14 in the conventional manner. The cone washer 26 is then made to engage hook 12 on the housing 10. Part 43 of the two part nut is then turned until the housing 10 is moved to the desired position by compressing the spring loaded pin 16. Pins 35 are then lined with longitudinal slots 37' and the spring 49 is compressed to force pins 35 into slots 37. Part 43 is then turned to engage pins in slots 37 which are inclined, as shown in FIG. 1. The loose fit of pins 45 in slots 47 permits part 43 to be turned without turning part 41. The spring 49 then retains pins 35 in slots 37 and keeps the two part nut from loosening, since cone washer 26 cannot turn on screw 27.

There is thus provided a safety locking device for airborn shock mounts which makes the use of safety wires unnecessary.

I claim:

1. In an apparatus for securing electronic equipment to a shockmount, including at least one support block on the electronic equipment housing for engaging a spring loaded pin secured to a support plate which is secured to the shock mount and at least one hook on the opposite side of the electronic equipment housing adapted to engage a safety locking device; a safety locking device, comprising: a hold down screw pivotably secured to the shockmount support plate; a cone washer adapted to engage said hook; said cone washer being slidably secured in non rotating relation on said hold down screw; said cone washer having a plurality of pins projecting from the periphery thereof; a two part nut with one part threadably engaging said hold down screw and a second part with a plurality of slots adapted to receive and engage the pins on said cone washer; said slots each having a first portion, extending axially of the second part of the two part nut, adapted to receive the pins on said cone washer and a second portion, extending circumferentially at an angle to the first portion and in the direction toward said hook, adapted to retain the pins on said cone washer; means for retaining said one part of the two part nut within the second part of the two part nut; said second part of the two part nut being axially movable with respect to the first part; means, located within the second part of the two part nut, for urging said one part axially away from the second part in the direction of the cone washer; whereby the pins on the cone washer are maintained in engagement in the second portion of the slots on the second part of the two part nut after they are engaged and means for permitting limited axial movement and relative rotation between the one part of the two part nut and the second part of the two part nut whereby the second part of the nut may be pushed axially over the cone washer to receive the pins in the first portion of said slots and being rotatable to engage the pins in the second portion of said slots.

2. The apparatus as recited in claim 1 wherein said means for permitting limited relative rotation between one part of the two part nut and the second part of the two part nut comprises a plurality of longitudinal slots on the inner surface of the second part and a plurality of pins projecting from the periphery of the one part into said longitudinal slots; the width of slots being greater than the diameter of pins on the one part of the two part nut.

* * * * *